Figure 1:
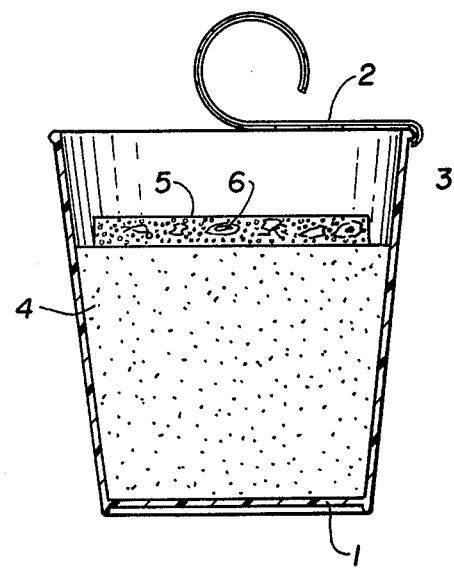

United States Patent [19] [11] 4,094,996
Sakakibara et al. [45] June 13, 1978

[54] PACKAGE OF CONVENIENCE FOOD

[75] Inventors: Sakuichi Sakakibara, Kobe; Ko Sugisawa; Takashi Kimura, both of Nara; Atsushi Yasuda, Sakai, all of Japan

[73] Assignee: House Food Industrial Company Limited, Higashi-Osakashi, Japan

[21] Appl. No.: 796,343

[22] Filed: May 12, 1977

[30] Foreign Application Priority Data

May 14, 1976 Japan ............................ 51-60170[U]

[51] Int. Cl.² ............................................ B65B 29/06
[52] U.S. Cl. .................................. 426/115; 426/506; 426/557; 426/568; 426/470
[58] Field of Search ............... 426/589, 115, 506, 86, 426/89, 96, 102, 614, 470, 568, 557

[56] References Cited

U.S. PATENT DOCUMENTS

| 2,836,498 | 5/1958 | Fennema | 426/102 X |
| 3,031,312 | 4/1962 | Morgan et al. | 426/470 |
| 3,064,722 | 11/1962 | Morgan et al. | 426/470 X |
| 3,115,413 | 12/1963 | Kline et al. | 426/470 |
| 3,164,473 | 1/1965 | Shields et al. | 426/96 |
| 3,364,036 | 1/1968 | Tesko | 426/96 |
| 3,607,306 | 9/1971 | McMichael | 426/589 X |
| 3,931,434 | 1/1976 | Murai | 426/96 |
| 3,976,795 | 8/1976 | Ando | 426/115 |
| 3,982,041 | 9/1976 | Steen et al. | 426/106 X |
| 3,987,207 | 10/1976 | Spaeti et al. | 426/589 X |
| 4,018,904 | 4/1977 | Muraoka | 426/115 |

FOREIGN PATENT DOCUMENTS

| 9,213 | 4/1970 | Japan | 426/614 |
| 33,702 | 10/1971 | Japan | 426/614 |

Primary Examiner—Steven L. Weinstein
Attorney, Agent, or Firm—Hans Berman

[57] ABSTRACT

A package of convenience food whose cup-shaped container is releasably sealed by a cover contains two layers of dehydrated food capable of being reconstituted by contact with hot water to which the container is impermeable. The bottom layer is a source of carbohydrate, such as instant rice or instant noodles, while the top layer essentially consists of foamed dehydrated egg.

7 Claims, 2 Drawing Figures

U.S. Patent  June 13, 1978  4,094,996

PACKAGE OF CONVENIENCE FOOD

This invention relates to dehydrated convenience foods capable of being reconstituted by contact with hot water, and particularly to a package containing a two-component, dehydrated convenience food.

The major source of calories in many convenience foods consists of carbohydrates in the form of dehydrated rice, dehydrated noodles, dehydrated potatoes, and the like which are of bland taste and unattractive appearance. It is customary to improve at least the taste of such dishes by mixing the carbohydrate source with seasoning or a source of protein, such as dehydrated sauces or vegetables, and dehydrated meat or fish, the latter term encompassing other seafood for the purpose of this invention. Egg powder may also be mixed with the starchy material. While such admixtures improve the taste and may improve the nutritional value of the carbohydrate base, they do not significantly improve the appearance of the reconstituted food as it presents itself to the user in its container or on a plate to which it may be transferred from the container.

It is a common feature of the sources of carbohydrate presently packaged in water-resistant containers that they are lighter than water and absorb water relatively slowly. If water is added to the dehydrated food in its container, the body of carbohydrate material initially floats on the added water, and the top of the body projects into the air from the water. Unless the contents of the container are stirred, it takes several minutes before the carbohydrate material is completely submersed in the water and uniformly hydrated. If a suitable waiting period is not observed, food eaten from the container may have a gritty mouth feel. Other conventional ingredients mixed with the carbohydrate material or sprinkled on the top surface of the carbohydrate have no relevant effect on the necessary waiting period.

It has now been found that a more appealing multi-component convenience food of the type described may be eaten or served from a container almost immediately after the addition of the hot water necessary for reconstitution if the main body of carbohydrate material is covered with a layer of foamed, dehydrated food which absorbs water quickly in an amount sufficient to reduce the floating tendency of the carbohydrate material, and to transmit part of its moisture content to the surface portion of the carbohydrate body which may momentarily project from the liquid in the container.

Edible proteins generally are more hydrophilic than edible carbohydrate sources, and the layer of foamed or cellular material covering substantially the entire top surface of the carbohydrate body preferably consists mainly of proteinaceous matter which, inherently, is insoluble in water. A protein source which lends itself particularly well to the purpose of this invention is dehydrated, foamed egg. The amount of dry egg material effective for significantly accelerating the uniform reconstitution of a carbohydrate base food is relatively small. If the same amount of egg material is deposited on the carbohydrate base in the form of commercial egg powder, it does not materially contribute to a more rapid reconstitution of the dehydrated food. If fresh eggs are beaten in a conventional manner to mix with much more than an equal volume of air, and the foam so obtained is dehydrated, there is obtained a cellular body of egg constituents enclosing a volume of gas much greater than the volume of the solid. Air bubbles may be distributed in the foam or nitrogen bubbles if it is preferred to process the egg in an inert atmosphere. The volume of the dehydrated, foamed egg material is many times greater than that of an equal weight of conventional egg powder, and it can cover much of the exposed surface of a body of dehydrated carbohydrate source, such as instant rice, instant noodles, or instant potatoes, particularly when used in the form of a thin layer or sheet of approximately uniform thickness.

Figure 2:
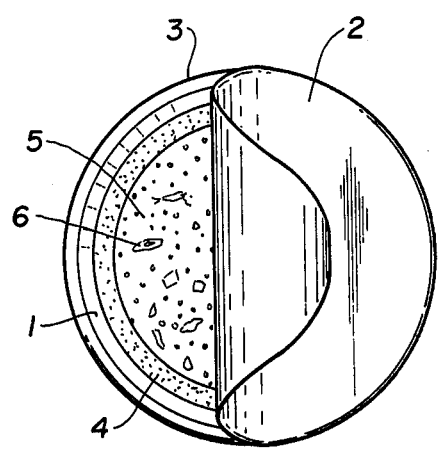

The exact nature of this invention as well as other objects and advantages thereof will be readily apparent from consideration of the following specification relating to the annexed drawing in which:

FIG. 1 shows a package of the invention in the partly opened condition, in side elevational section; and FIG. 2 illustrates the package of FIG. 1 in top plan view.

The container of the illustrated package has a cup-shaped main portion 1 of thermally insulating cellular polystyrene and a circular cover 2 of paper lined with aluminum foil whose edge is crimped over the rim 3 of the polystyrene cup 1 in the sealed condition of the container. The main portion 1 is filled to about three quarters with a body 4 of dehydrated carbohydrate food, such as instant rice, instant noodles, or instant potato powder or flakes. The surface of the body 4 directed toward the cover 2 in the sealed container, and toward the opening of the container in the illustrated condition, is covered by a flat layer 5 of foamed, dehydrated chicken egg in which a few pieces 6 of meat or fish or seafood are distributed and stand out clearly against the light yellow egg background.

When hot water is poured into the opened container, the foamed egg 5 absorbs water much faster than the carbohydrate food 4 and remains on top of the two-component dish until the water is completely absorbed and the contents of the container are ready to be eaten almost immediately after addition of the water. The appearance of the dish is more appetizing than it would be at equal overall composition and nutritive value if the egg were dispersed in the carbohydrate material in the form of egg powder. It has also been found convenient to add cold water to the dry contents of the container, and then to place the container in a microwave oven for less than 1 minute to make the dish ready for eating.

The cellular egg material need not be deposited on the surface of the basic food ingredient in a single, coherent body to achieve the objects of this invention, and several pieces may be cut from a flat plate of foamed and dehydrated egg and placed over most of the surface of the carbohydrate base to produce the desired effect.

While cellular, dehydrated meat products and other sources of protein may be substituted for the foamed egg material, only foamed, dehydrated egg combines a very low bulk density, even in the reconstituted condition, high nutrient value, and distinctive, pleasing color in a manner that makes the illustrated food package of the invention most appealing and its contents easy to reconstitute uniformly in a minimum of time.

Foamed, dehydrated egg, to the best of our knowledge, was never produced prior to our invention, and it has no known use outside of this invention. It is readily prepared by drying conventionally beaten egg in warm air or even by freeze-drying the beaten egg for production on a larger scale. Neither procedure offers significant difficulties. Sterile conditions are preferably maintained while the egg material contains water. After dehydration, it keeps well in a container sealed under aseptic conditions. After it is reconstituted, the normal rules of hygiene are to be observed.

It should be understood that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A package of convenience food comprising:
   (a) a container of water-resistant material having an open side;
   (b) a body of a first dehydrated food and at least one separate body of a second dehydrated food in said container,
   (1) each of said bodies being capable of being reconstituted by contact with hot water,
   (2) said first food consisting essentially of at least one source of carbohydrate substantially insoluble in and lighter than water and having a surface directed toward said open side,
   (3) said at least one body consisting essentially of foamed or cellular dehydrated solid material substantially insoluble in water but capable of absorbing hot water more quickly than said first food, most of said surface being covered by said at least one body which absorbs water quickly in an amount sufficient to reduce the floating tendency of the carbohydrate material such that the uniform reconstitution of said first dehydrated food is accelerated.

2. A package as set forth in claim 1, wherein one body of said second food covers most of said surface in a coherent layer.

3. A package as set forth in claim 2, wherein said second food consists essentially of dehydrated foamed chicken egg.

4. A package as set forth in claim 1, further comprising a cover releasably sealing said open side.

5. A package as set forth in claim 4, wherein said solid material predominantly consists of a source of protein.

6. A package as set forth in claim 4, wherein said source of protein essentially consists of dehydrated foamed chicken egg.

7. A package as set forth in claim 6, wherein said second food is yellow.

* * * * *